United States Patent

Aurin et al.

[11] 3,936,152
[45] Feb. 3, 1976

[54] BINOCULAR VIEWING DEVICE

[75] Inventors: Friedrich Aurin, Heidenheim-Schnaitheim; Paul Kantor, Aalen; Helmut Knutti, Oberkochen; Hans-Richard Weinheimer, Konigsbronn, all of Germany

[73] Assignee: Carl Zeiss Stiftung, Oberkochen, Germany

[22] Filed: Apr. 23, 1974

[21] Appl. No.: 463,380

[30] Foreign Application Priority Data
Apr. 28, 1973 Germany............................ 2321716

[52] U.S. Cl. ................ 350/202; 350/35; 350/145; 350/189; 350/216; 350/220
[51] Int. Cl.² ................... G02B 25/00; G02B 21/20
[58] Field of Search ....... 350/35, 36, 145, 146, 202, 350/189, 216, 220

[56] References Cited
UNITED STATES PATENTS

| | | | |
|---|---|---|---|
| 1,240,905 | 9/1917 | Troppman | 350/145 |
| 1,650,646 | 11/1927 | Ott | 350/35 |
| 2,885,928 | 5/1959 | Baker | 350/189 |

*Primary Examiner*—David H. Rubin
*Attorney, Agent, or Firm*—Stonebraker, Shepard & Stephens

[57] ABSTRACT

A device for binocular viewing of, for instance, fluorescent screens, image converters, and image intensifiers. Designed to be hand held, the device is light and compact. A single optical system of at least four lens elements provides the desired magnification. Behind the last element (in the direction of travel of the light from the object being viewed to the eyes of the person using the device) there are two rhombic prisms to spread the light beam to the two eyes of the user. In a preferred form, the prisms are adjustable to match the interpupillary distance of the user. At least one of the lens elements of the magnification system preferably has an aspherical surface.

3 Claims, 3 Drawing Figures

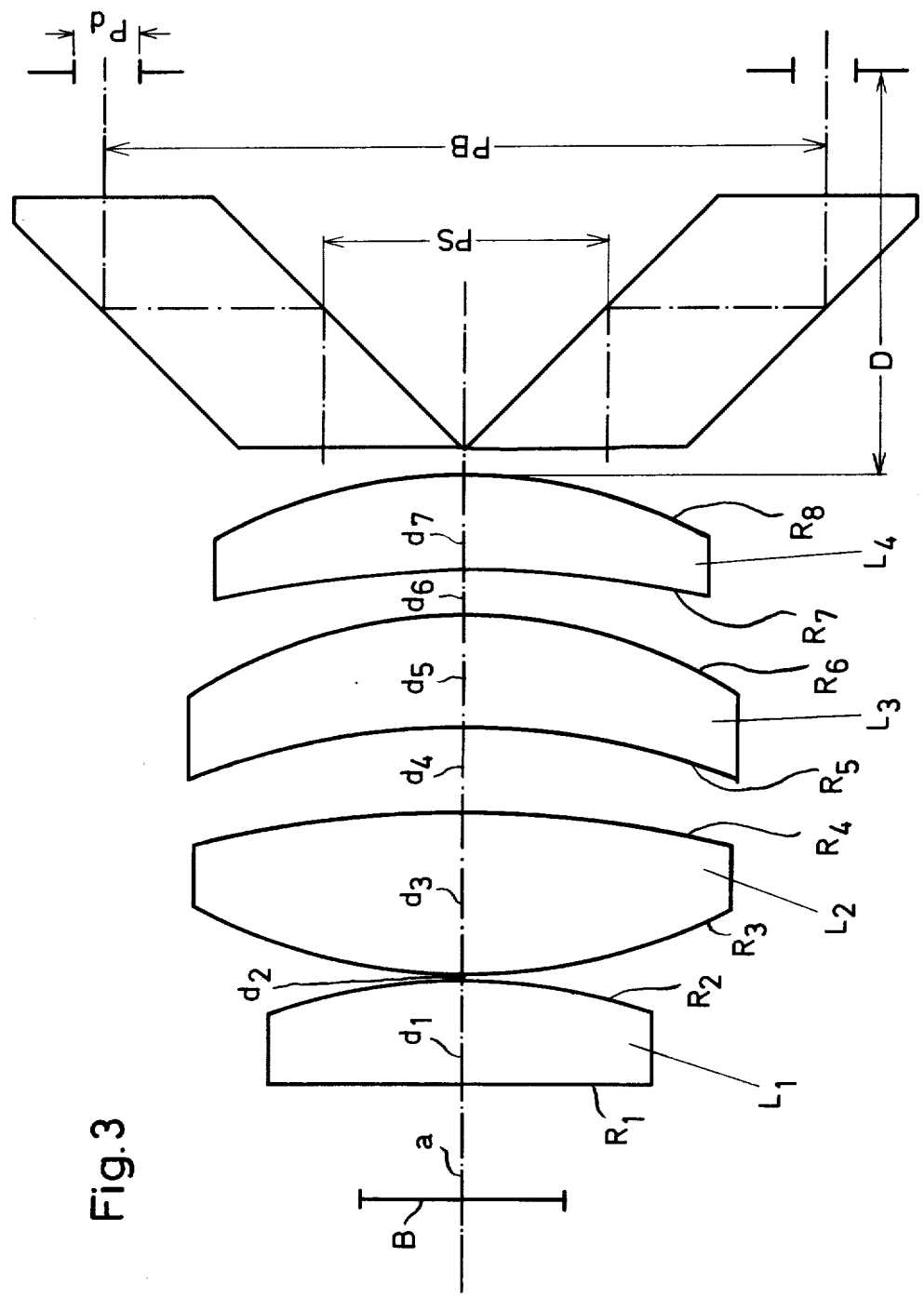

BINOCULAR VIEWING DEVICE

BACKGROUND OF THE INVENTION

In the known forms of binocular viewing devices for viewing image converters, image intensifiers, or fluorescent screens, there are usually two separate optical magnification systems, one for each eye of the user, just as in the case of ordinary binoculars or field glasses. Accordingly, the prior art devices are bulky and heavy, which is particularly undesirable if the device is to be held in the hand of the user.

An object of the present invention is to provide a device which is both compact and light in weight, enabling the device to be held easily in the hand of the user. In furtherance of this object, the device of the present invention has only a single optical magnification system, rather than two systems, and the lens elements of this magnification system are formed of material having the lowest possible density consistent with the desired optical properties. At the rear end of the optical system (the end toward the eyes of the user) there are two rhombic prisms behind the last lens surface of the system, which effect a pupillary division or spread the light beam to increase the interpupillary distance to match or approximately match that of the eyes of the user or observer.

BRIEF DESCRIPTION OF THE DRAWINGS

FIG. 3 is a similar diagram illustrating a third embodiment of the invention.

DESCRIPTION OF THE PREFERRED EMBODIMENTS

Figure 1:
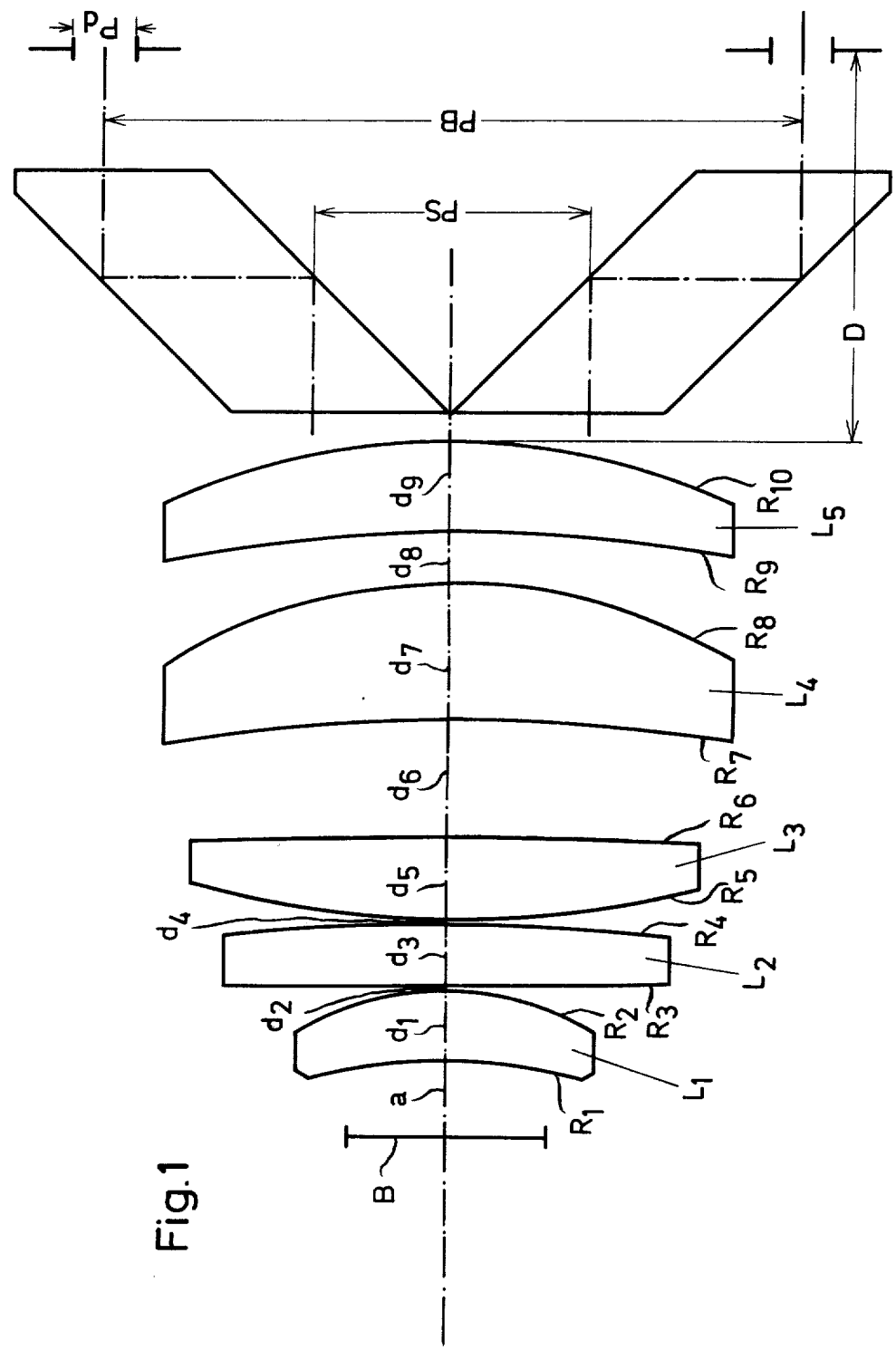
FIG. 1 is a schematic diagram of the optical elements of a device according to a first embodiment of the invention.

The optical system advantageously comprises at least four individual lenses having at least one aspherical surface, and is corrected for an interpupillary distance of the optical system corresponding approximately to the focal length for spherical deviation, sine condition, and an angle of view of more than 12° for coma and astigmatism and distortion. The distance of the exit pupil in the stretched optical path reduced in air, from the last vertex of the optical system, is greater than the equivalent focal length of the optical system. The back focus distance, from the screen being observed to the first surface of the first lens element, is equal to or greater than 0.2 times the equivalent focal length of the system.

The optical material used for the manufacture of the lens elements should have the smallest possible specific gravity, and the highest possible refractive index. The materials specified in the specific examples below, fulfill this condition guite well.

In one illustrative embodiment of the invention, the rhombic prisms are rotatable for adjustment of the interpupillary distance of the observer, that is, of the user of the instrument.

The advantages obtained with the present invention resides particularly in the small or compact construction of the apparatus, and in its lightness or low weight. As a result of the combination of the optical system with two rhombic prisms to divide and spread the light beam to the proper interpupillary distance for the eyes of the user or observer, it is no longer necessary to use two telescopes arranged behind the objective lens, in the manner in which telescopic magnifiers of this general type have been known in the past. The eyes of the observer can be brought directly to the exit pupils of the optical system, which are located behind the rhombic prisms. By eliminating one of the two telescope systems used in the prior art, and yet arranging the system so that binocular viewing is possible rather than monocular, there is a great saving both in weight and in size. There is a further saving in weight by reason of the choice of the particular material herein disclosed for the lens elements, which material is of the lowest possible density or weight, and the highest possible index of refraction.

As already stated, the optical system preferably includes at least one aspherical surface. The meridian curves of the aspherical surfaces are characterized by the following equation or formula:

$$p = h^2/2r + \bar{c}_1 \, h^4 + \bar{c}_2 h^6 + \bar{c}_3 h^8 + \bar{c}_4 h^{10}$$

In this equation:
$p$ = the height of arc or camber
$h$ = the corresponding meridional coordinate
$r$ = the radius of the zenith or vertex.

The values of the coefficients $\bar{c}_1$, $\bar{c}_2$, $\bar{c}_3$, and $\bar{c}_4$ are given in the tables relating to the specific examples.

As indicated in the data tables of the specific examples, all of the lens elements are constructed of one or the other of two kinds of optical glass, which have been chosen for their compliance with the above mentioned desirable characteristics of low density and high index of refraction. The two glasses which have been chosen for use in the present invention are those designated as SF 6 and LaK 8, these glasses under these identifications being known in the art and being identified in the 1972 edition of the glass catalogue of the well known firm of Jenaer Glaswerk, Schott & Genossen, published at Mainz, Germany. Some of the characteristics of these two glasses are as follows:

|  | SF 6 | LaK 8 |
|---|---|---|
| Refractive index $N_d$ | 1.80518 | 1.71300 |
| Index of dispersion or Abbe number $V_d$ | 25.43 | 53.83 |
| Density, grams per cubic centimeter | 5.18 | 3.78 |

Both the refractive index $N_d$ and the Abbe number $V_d$ were determined by reference to the yellow helium line having the wavelength of 5875.6 Angstrom units.

Figure 2:
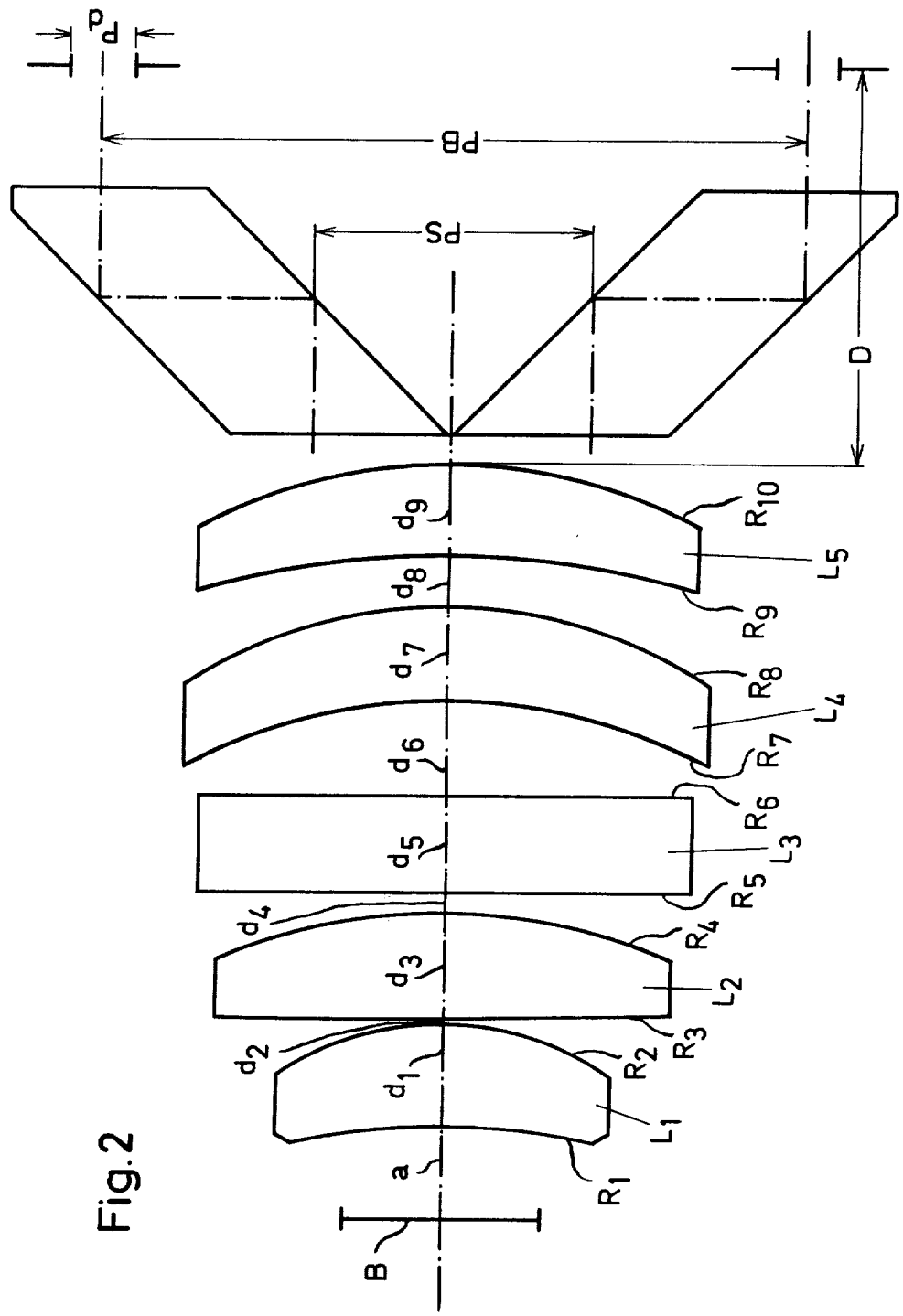
FIG. 2 is a similar diagram illustrating a second embodiment of the invention.

Data for the three specific examples of the invention are given below. Constructions according to these three examples are illustrated schematically in the lens diagrams constituting FIGS. 1–3, respectively, of the drawings. In the tables of the specific examples as well as in the corresponding parts of the claims, the lens elements are numbered consecutively from front to rear (in the direction of travel of light from the screen which is being observed to the eyes of the observer) and are designated by the letter L with a numerical subscript corresponding to the consecutive number of the element. The radii of the lens surfaces are indicated by the letter R with a numerical subscript corresponding to consecutive numbering of the surfaces from front to rear. The axial thicknesses, both of the lens elements and of the air spaces between them, are indicated by the letter $d$ with a subscript corresponding to the consecutive numbering of the axial thicknesses and spacings both numbered together in a single series. That is, for example, the axial thickness of the first lens element $L_1$ is indicated by $d_1$, the axial thickness or space of the interval between this element and the second element is indicated by $d_2$, the thickness of the second lens element $L_2$ is indicated by $d_3$, the interval between this lens and the next lens element is $d_4$, and so on.

The interpupillary distance of the optical system is designated PS, and the interpupillary distance of the observer or user is designated PB. The distance of the exit pupil from the vertex of the last lens, in the straightened ray path, reduced to air, is designated D. The pupil diameter is designated by $P_d$, the diameter of the image to be viewed is designated by B, and the distance from the image which is being viewed to the axial vertex of the first surface of the first lens element is designated by $a$.

In accordance with conventional lens patent practice, radii with plus signs indicate surfaces convex toward the front, and radii with minus signs indicate surfaces concave toward the front.

It will be noted, from the specific examples data, that the interpupillary distance (PS) of the optical system is approximately equal to the equivalent focal length $(f)$ of the system, PS being usually between 0.7 and 0.8 times $f$.

Example I

| Lens | | Radii mm. | Thicknesses and Spacings, mm. | | Glass |
|---|---|---|---|---|---|
| $L_1$ | $R_1$ | $= - 40.4$ | | | |
| | | | $d_1 =$ | 6.8 | SF 6 |
| | $R_2$ | $= - 26.8$ | | | |
| | | | $d_2 =$ | 0.1 | |
| $L_2$ | $R_3$ | $= +494.0$ | | | |
| | | | $d_3 =$ | 6.2 | LaK 8 |
| | $R_4$ | $= -191.1$ | | | |
| | | | $d_4 =$ | 0.1 | |
| $L_3$ | $R_5$ | $= + 93.7$ | | | |
| | | | $d_5 =$ | 7.9 | LaK 8 |
| | $R_6$ | $= -755.3$ | | | |
| | | | $d_6 =$ | 10.7 | |
| $L_4$ | $R_7$ | $= -154.0$ | | | |
| | | | $d_7 =$ | 12.4 | LaK 8 |
| | $R_8$ | $= - 47.6$ | | | |
| | | | $d_8 =$ | 4.8 | |
| $L_5$ | $R_9$ | $= -137.2$ | | | |
| | | | $d_9 =$ | 8.1 | LaK 8 |
| | $R_{10}$ | $= - 52.3$ | | | |

| | | |
|---|---|---|
| Focal length | $= f =$ | 32. mm |
| Distance from image being viewed to first vertex | $= a =$ | 7.0 mm |
| Interpupillary distance of system | $= PS =$ | 25. mm |
| Interpupillary distance of observer | $= PB =$ | 58-72mm |
| Distance of exit pupil from last vertex along stretched optical path, reduced to air | $= D =$ | 40 mm |
| Diameter of pupil | $= P_d =$ | 6.0 mm |
| Diameter of image to be observed | $= B =$ | 18.0 mm |

Aspherical surfaces data:

| | Surface $R_3$ | Surface $R_6$ | Surface $R_{10}$ |
|---|---|---|---|
| $\overline{c}_1$ | $2.0350869.10^{-6}$ | $1.5410828.10^{-7}$ | $-5.6828165.10^{-10}$ |
| $\overline{c}_2$ | $-1.3712518.10^{-8}$ | $-7.7980634.10^{-10}$ | $1.6465498.10^{-9}$ |
| $\overline{c}_3$ | $2.2478209.10^{-11}$ | $-8.2352009.10^{-13}$ | $-9.6092972.10^{-13}$ |
| $\overline{c}_4$ | $-1.1904954.10^{-14}$ | $6.8468427.10^{-16}$ | $9.2018506.10^{-16}$ |

Example II

| Lens | | Radii mm. | Thicknesses and Spacings, mm. | | Glass |
|---|---|---|---|---|---|
| $L_1$ | $R_1$ | $= - 65.9$ | | | |
| | | | $d_1 =$ | 9.6 | SF 6 |
| | $R_2$ | $= - 27.6$ | | | |
| | | | $d_2 =$ | 0.1 | |
| | $R_3$ | $= + 805.8$ | | | |

-continued
Example II

| Lens | | Radii mm. | Thicknesses and Spacings, mm. | | Glass |
|---|---|---|---|---|---|
| $L_2$ | | | $d_3 =$ | 10.0 | LaK 8 |
| | $R_4$ | $= - 54.6$ | | | |
| | | | $d_4 =$ | 2.0 | |
| | $R_5$ | $= -2660.7$ | | | |
| $L_3$ | | | $d_5 =$ | 9.0 | LaK 8 |
| | $R_6$ | $= - 427.8$ | | | |
| | | | $d_6 =$ | 8.0 | |
| | $R_7$ | $= - 54.6$ | | | |
| $L_4$ | | | $d_7 =$ | 8.9 | LaK 8 |
| | $R_8$ | $= - 45.3$ | | | |
| | | | $d_8 =$ | 4.6 | |
| | $R_9$ | $= - 109.0$ | | | |
| $L_5$ | | | $d_9 =$ | 8.6 | LaK 8 |
| | $R_{10}$ | $= - 48.3$ | | | |

| | | | | |
|---|---|---|---|---|
| f | = 32 mm. | | a = | 8.3 mm. |
| PS | = 25 mm. | | PB = | 58-72 mm. |
| D | = 40 mm. | $P_d =$ 6.0 mm. | B = | 18.0 mm. |

Aspherical surface data, for surface $R_{10}$:
$\overline{c}_1 = 5.7415848.10^{-7}$   $\overline{c}_2 = 8.2395839.10^{-10}$
$\overline{c}_3 = -1.5014718.10^{-12}$   $\overline{c}_4 = 1.3082327.10^{-15}$ Example III

| Lens | | Radii, mm. | Thicknesses and Spacings, mm. | | Glass |
|---|---|---|---|---|---|
| $L_1$ | $R_1$ | $= -494.0$ | | | |
| | | | $d_1 =$ | 9.6 | LaK 8 |
| | $R_2$ | $= - 53.8$ | | | |
| | | | $d_2 =$ | 0.1 | |
| | $R_3$ | $= + 50.8$ | | | |
| $L_2$ | | | $d_3 =$ | 15.0 | LaK 8 |
| | $R_4$ | $= -112.2$ | | | |
| | | | $d_4 =$ | 7.8 | |
| | $R_5$ | $= - 75.5$ | | | |
| $L_3$ | | | $d_5 =$ | 10.0 | LaK 8 |
| | $R_6$ | $= - 50.1$ | | | |
| | | | $d_6 =$ | 3.9 | |
| | $R_7$ | $= - 99.3$ | | | |
| $L_4$ | | | $d_7 =$ | 8.8 | LaK 8 |
| | $R_8$ | $= - 48.0$ | | | |

| | | | | |
|---|---|---|---|---|
| f | = 32 mm. | | a = | 10.4 mm. |
| PS | = 25 mm. | | PB = | 58- 72 mm. |
| D | = 40 mm. | $P_d =$ 6.0 mm. | B = | 18.0 mm. |

Aspherical surfaces data:

| | $R_3$ | $R_8$ |
|---|---|---|
| $\overline{c}_1$ | $-3.075859.10^{-6}$ | $1.6200846.10^{-6}$ |
| $\overline{c}_2$ | $-2.3933100.10^{-9}$ | $4.4770853.10^{-9}$ |
| $\overline{c}_3$ | $5.0879675.10^{-12}$ | $-8.5488883.10^{-12}$ |
| $\overline{c}_4$ | $-2.3529152.10^{-15}$ | $5.5044338.10^{-15}$ |

What is claimed is:

1. A light weight hand-held device for magnified binocular viewing of fluorescent screens and the like, comprising only a single optical magnification system producing the entire desired magnification for binocular viewing, said optical magnification system including at least four individual lens elements with at least one aspherical surface, each of said individual lens elements being made of optical material having relatively low specific gravity and relatively high index of refraction, the magnification system being corrected, for an interpupillary distance (PS) of the optical system which corresponds approximately to the equivalent focal length $(f)$ of the system, for spherical aberration, sine condition, and for a viewing angle of more than 12° for coma and astigmatism and distortion, said device having two rhombic prisms located behind the last surface of said single optical system, said prisms being so placed as to effect a pupillary division and to increase the interpupillary distance (PS) at said last surface to the interpupillary distance (PB) of an observer using the device, the lens elements and prisms being constructed and arranged with proportions substantially in accordance with the following structural data:

| Lens | Radii mm. | Thicknesses and Spacings, mm. | Glass N | V |
|---|---|---|---|---|
| $L_1$ | $R_1 = -40.4$ | $d_1 =$ 6.8 | 1.80518 | 23.43 |
|  | $R_2 = -26.8$ | $d_2 =$ 0.1 |  |  |
| $L_2$ | $R_3 = +494.0$ | $d_3 =$ 6.2 | 1.713 | 53.83 |
|  | $R_4 = -191.1$ | $d_4 =$ 0.1 |  |  |
| $L_3$ | $R_5 = +93.7$ | $d_5 =$ 7.9 | " | " |
|  | $R_6 = -755.3$ | $d_6 =$ 10.7 |  |  |
| $L_4$ | $R_7 = -154.0$ | $d_7 =$ 12.4 | " | " |
|  | $R_8 = -47.6$ | $d_8 =$ 4.8 |  |  |
| $L_5$ | $R_9 = -137.2$ | $d_9 =$ 8.1 | " | " |
|  | $R_{10} = -52.3$ |  |  |  |

| | | |
|---|---|---|
| Focal length | $= f =$ | 32. mm |
| Distance from image being viewed to first vertex | $= a =$ | 7.0 mm |
| Interpupillary distance of system | $= PS =$ | 25. mm |
| Interpupillary distance of observer | $= PB =$ | 58–72 mm |
| Distance of exit pupil from last vertex along stretched optical path, reduced to air | $= D =$ | 40 mm |
| Diameter of pupil | $= P_d =$ | 6.0 mm |
| Diameter of image to be observed | $= B =$ | 18.0 mm |

Aspherical surfaces data:

| | Surface $R_3$ | Surface $R_8$ | Surface $R_{10}$ |
|---|---|---|---|
| $\overline{c}_1$ | $2.0350869 \cdot 10^{-6}$ | $1.5410828 \cdot 10^{-7}$ | $-5.6828165 \cdot 10^{-10}$ |
| $\overline{c}_2$ | $-1.3712518 \cdot 10^{-8}$ | $-7.7980634 \cdot 10^{-10}$ | $1.6465498 \cdot 10^{-9}$ |
| $\overline{c}_3$ | $2.2478209 \cdot 10^{-11}$ | $-8.2352009 \cdot 10^{-13}$ | $-9.6092972 \cdot 10^{-13}$ |
| $\overline{c}_4$ | $-1.1904954 \cdot 10^{-14}$ | $6.8468427 \cdot 10^{-16}$ | $9.2018506 \cdot 10^{-16}$ | wherein the individual lens elements numbered consecutively from front to rear are indicated by the respective subscript numerals used with the letter L, the radii of curvature of the surfaces of such lens elements are respectively indicated by the letter R with a numerical subscript corresponding to consecutive numbering of the surfaces from front to rear, the axial thicknesses of the respective lens elements and of the air space between the elements are respectively indicated by the letter d with a numerical subscript corresponding to consecutive numbering of such thicknesses in a single series applying to both the element thicknesses and the air space thicknesses, the index of refraction of the material of which each lens element is made is indicated in the column headed N, the index of dispersion of such material is indicated in the column headed V, both indices being with reference to the yellow helium line having a wavelength of 5875.6 Angstrom units, and the values respectively indicated by the letters C with numerical subscripts are the values of the coefficients used in defining the aspherical shape of the respectively indicated lens surfaces, according to the aspherical equation $$p = h^2/2r + \overline{c}_1 h^4 + \overline{c}_2 h^6 + \overline{c}_3 h^8 + \overline{c}_4 h^{10}$$

wherein p = the height of arc or camber, h = the corresponding meridional coordinate, and r = the radius of the zenith or vertex.

2. A light weight hand-held device for magnified binocular viewing of fluorescent screens and the like, comprising only a single optical magnification system producing the entire desired magnification for binocular viewing, said optical magnification system including at least four individual lens elements with at least one aspherical surface, each of said individual lens elements being made of optical material having relatively low specific gravity and relatively high index of refraction, the magnification system being corrected, for an interpupillary distance (PS) of the optical system which corresponds approximately to the equivalent focal length (f) of the system, for spherical aberration, sine condition, and for a viewing angle of more than 12° for coma and astigmatism and distortion, said device having two rhombic prisms located behind the last surface of said single optical system, said prisms being so placed as to effect a pupillary division and to increase the interpupillary distance (PS) at said last surface to the interpupillary distance (PB) of an observer using the device, the lens elements and prisms being constructed and arranged with proportions substantially in accordance with the following structural data:

| Lens | Radii mm. | Thicknesses and Spacings, mm. | Glass N | V |
|---|---|---|---|---|
| $L_1$ | $R_1 = -65.9$ | $d_1 =$ 9.6 | 1.80518 | 25.43 |
|  | $R_2 = -27.6$ | $d_2 =$ 0.1 |  |  |
| $L_2$ | $R_3 = +805.8$ | $d_3 =$ 10.0 | 1.713 | 53.83 |
|  | $R_4 = -54.6$ | $d_4 =$ 2.0 |  |  |
| $L_3$ | $R_5 = -2660.7$ | $d_5 =$ 9.0 | " | " |
|  | $R_6 = -427.8$ | $d_6 =$ 8.0 |  |  |
| $L_4$ | $R_7 = -54.6$ | $d_7 =$ 8.9 | " | " |
|  | $R_8 = -45.3$ | $d_8 =$ 4.6 |  |  |
| $L_5$ | $R_9 = -109.0$ | $d_9 =$ 8.6 | " | " |
|  | $R_{10} = -48.3$ |  |  |  |

| | | |
|---|---|---|
| Focal length | $= f =$ | 32. mm |
| Distance from image being viewed to first vertex | $= a =$ | 8.3 mm |
| Interpupillary distance of system | $= PS =$ | 25 mm |
| Interpupillary distance of observer | $= PB =$ | 58–72mm |
| Distance of exit pupil from last vertex along stretched optical path, reduced to air | $= D =$ | 40 mm |
| Diameter of pupil | $= P_d =$ | 6.0 mm |
| Diameter of image to be observed | $= B =$ | 18.0 mm |

Aspherical surface data, for surface $R_{10}$:
$\overline{c}_1 = 5.7415848 \cdot 10^{-7}$  $\overline{c}_2 = 8.2395839 \cdot 10^{-10}$
$\overline{c}_3 = -1.5014718 \cdot 10^{-12}$  $\overline{c}_4 = 1.3082327 \cdot 10^{-15}$ wherein the individual lens elements numbered consecutively from front to rear are indicated by the respective subscript numerals used with the letter L, the radii of curvature of the surfaces of such lens elements are respectively indicated by the letter R with a numerical subscript corresponding to consecutive numbering of the surfaces from front to rear, the axial thicknesses of the respective lens elements and of the air spaces between the elements are respectively indicated by the letter d with a numerical subscript corresponding to consecutive numbering of such thicknesses in a single series applying to both the element thicknesses and the air space thicknesses, the index of refraction of the material of which each lens element is made is indicated in the column headed N, the index of dispersion of such material is indicated in the column headed V, both indices being with reference to the yellow helium line having a wavelength of 5875.6 Angstrom units, and the values respectively indicated by the letters C with numerical subscripts are the values of the coefficients used in defining the aspherical shape of the respectively indicated lens surfaces, according to the aspherical equation $$p = h^2/2r + \overline{c}_1 h^4 + \overline{c}_2 h^6 + \overline{c}_3 h^8 + \overline{c}_4 h^{10}$$

wherein p = the height of arc or camber, h = the corresponding meridional coordinate, and r = the radius of the zenith or vertex.

3. A light weight hand-held device for magnified binocular viewing of fluorescent screens and the like, comprising only a single optical magnification system producing the entire desired magnification for binocular viewing, said optical magnification system including at least four individual lens elements with at least one aspherical surface, each of said individual lens elements being made of optical material having relatively low specific gravity and relatively high index of refraction, the magnification system being corrected, for an interpupillary distance (PS) of the optical system which corresponds approximately to the equivalent focal length (f) of the system, for spherical aberration, sine condition, and for a viewing angle of more than 12° for coma and astigmatism and distortion, said device having two rhombic prisms located behind the last surface of said single optical system, said prisms being so placed as to effect a pupillary division and to increase the interpupillary distance (PS) at said last surface to the interpupillary distance (PS) of an observer using the device, the lens elements and prisms being constructed and arranged with proportions substantially in accordance with the following structural data:

| Lens | Radii mm. | Thicknesses and Spacings, mm. | Glass N | V |
|---|---|---|---|---|
| $L_1$ | $R_1 = -494.0$ | | | |
| | | $d_1 =$ 9.6 | 1.713 | 53.83 |
| | $R_2 = -53.8$ | | | |
| | | $d_2 =$ 0.1 | | |
| $L_2$ | $R_3 = +50.8$ | | | |
| | | $d_3 =$ 15.0 | '' | '' |
| | $R_4 = -112.2$ | | | |
| | | $d_4 =$ 7.8 | | |
| $L_3$ | $R_5 = -75.5$ | | | |
| | | $d_5 =$ 10.0 | '' | '' |
| | $R_6 = -50.1$ | | | |
| | | $d_6 =$ 3.9 | | |
| $L_4$ | $R_7 = -99.3$ | | | |
| | | $d_7$ | '' | '' |

| Lens | Radii mm. | Thicknesses and Spacings, mm. | Glass N | V |
|---|---|---|---|---|
| | $R_8 = -48.0$ | | | |

| | | |
|---|---|---|
| Focal length | = f | 32. mm |
| Distance from image being viewed to first vertex | = a = | 10.4 mm |
| Interpupillary distance of system | = PS = | 25 mm |
| Interpupillary distance of observer | = PB = | 58–72mm |
| Distance of exit pupil from last vertex along stretched optical path, reduced to air | = D = | 40 mm |
| Diameter of pupil | = $P_d$ = | 6.0 mm |
| Diameter of image to be observed | = B = | 18.0 mm |

Aspherical surfaces data:

| | $R_3$ | $R_8$ |
|---|---|---|
| $\overline{c}_1$ | $-3.075859 \cdot 10^{-6}$ | $1.6200846 \cdot 10^{-6}$ |
| $\overline{c}_2$ | $-2.3933100 \cdot 10^{-9}$ | $4.4770853 \cdot 10^{-9}$ |
| $\overline{c}_3$ | $5.0879675 \cdot 10^{-12}$ | $-8.5488883 \cdot 10^{-12}$ |
| $\overline{c}_4$ | $-2.3529152 \cdot 10^{-15}$ | $5.5044338 \cdot 10^{-15}$ | wherein the individual lens elements numbered consecutively from front to rear are indicated by the respective subscript numerals used with the letter L, the radii of curvature of the surfaces of such lens elements are respectively indicated by the letter R with a numerical subscript corresponding to consecutive numbering of the surfaces from front to rear, the axial thicknesses of the respective lens elements and of the air spaces between the elements are respectively indicated by the letter d with a numerical subscript corresponding to consecutive numbering of such thicknesses in a single series applying to both the element thicknesses and the air space thicknesses, the index of refraction of the material of which each lens element is made is indicated in the column headed N, the index of dispersion of such material is indicated in the column headed V, both indices being with reference to the yellow helium into having a wavelength of 5875.6 Angstrom units, and the values respectively indicated by the letters C with numerical subscripts are the values of the coefficients used in defining the aspherical shape of the respectively indicated lens surfaces, according to the aspherical equation $$p = h^2/2r + \overline{c}_1 h^4 + \overline{c}_2 h^6 + \overline{c}_3 h^8 + \overline{c}_4 h^{10}$$

wherein p = the height of arc or camber, h = the corresponding meridional coordinate, and r = the radius of the zenith or vertex.

* * * * *